United States Patent
Kobayashi

(10) Patent No.: US 10,362,239 B2
(45) Date of Patent: Jul. 23, 2019

(54) IMAGE PROCESSING APPARATUS AND METHOD, AND IMAGE CAPTURING APPARATUS FOR TONE CONVERSION BASED ON LUMINANCE VALUES

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 15/814,820

(22) Filed: Nov. 16, 2017

(65) Prior Publication Data
US 2018/0139391 A1     May 17, 2018

(30) Foreign Application Priority Data
Nov. 17, 2016 (JP) .................................. 2016-224536

(51) Int. Cl.
*H04N 5/243*     (2006.01)
*G06T 5/00*     (2006.01)
(Continued)

(52) U.S. Cl.
CPC ............. *H04N 5/243* (2013.01); *G06T 5/009* (2013.01); *H04N 5/14* (2013.01); *H04N 9/646* (2013.01);
(Continued)

(58) Field of Classification Search
CPC .......... H04N 5/243; H04N 5/14; H04N 9/735; H04N 9/646; H04N 5/2352; H04N 5/57;
(Continued)

(56) References Cited

U.S. PATENT DOCUMENTS

| 9,253,374 B2 | 2/2016 | Kobayashi | |
| 2015/0245043 A1* | 8/2015 | Greenebaum | H04N 19/98 |
| | | | 375/240.25 |
| 2017/0018257 A1* | 1/2017 | Miller | G06F 3/14 |

FOREIGN PATENT DOCUMENTS

| JP | 2008-234315 A | 10/2008 | |
| JP | 2008234315 | * 10/2008 | G06T 1/00 |

OTHER PUBLICATIONS

International Telecommunication Union, ITU-R Radiocommunication Sector of ITU, "The Present State of Ultra High Definition Television," Report ITU-R BT.2246-1, BT Series, Aug. 2012, pp. 1-76.

* cited by examiner

*Primary Examiner* — Twyler L Haskins
*Assistant Examiner* — Akshay Trehan
(74) *Attorney, Agent, or Firm* — Carter, DeLuca & Farrell LLP

(57) ABSTRACT

An image processing apparatus comprising: an acquisition unit that acquires exposure information of an image signal; a setting unit that sets tone conversion characteristic based on the exposure information and visual characteristics; and a tone conversion unit that performs tone conversion on the image signal using the tone conversion characteristic. The visual characteristics is a minimum amount of luminance change that a human can recognize and that differ for different luminance, and the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the intersection.

16 Claims, 5 Drawing Sheets

(51) Int. Cl.
*H04N 5/14* (2006.01)
*H04N 9/73* (2006.01)
*H04N 9/64* (2006.01)
H04N 5/235 (2006.01)
H04N 5/57 (2006.01)
H04N 9/69 (2006.01)

(52) U.S. Cl.
CPC ......... *H04N 9/735* (2013.01); *G06T 2207/10* (2013.01); *G06T 2207/20008* (2013.01); *H04N 5/2352* (2013.01); *H04N 5/57* (2013.01); *H04N 9/69* (2013.01)

(58) Field of Classification Search
CPC . H04N 9/69; G06T 5/009; G06T 2207/20008; G06T 2207/10; G06T 5/007; G06T 5/008; G06T 2207/20208
See application file for complete search history.

IMAGE PROCESSING APPARATUS AND METHOD, AND IMAGE CAPTURING APPARATUS FOR TONE CONVERSION BASED ON LUMINANCE VALUES

BACKGROUND OF THE INVENTION

Field of the Invention

The present invention relates to an image processing apparatus and method, and an image capturing apparatus, and more particularly to an image processing apparatus and method, and an image capturing apparatus for performing tone conversion of image signals.

Description of the Related Art

Conventionally, an output dynamic range of an output device such as a television or a display is not sufficient, and images can be displayed only in a dynamic range which is considerably narrower than a dynamic range of an actual subject. For this reason, when a subject is shot with the image capturing apparatus, it is necessary to compress a wide dynamic range of the video signal into the dynamic range of display of the output device. When such processing was performed, a video was displayed on the output device in a state different from the actual appearance of the subject, and the realistic feeling was lost.

However, due to recent technological innovation, the maximum luminance output of an output device has greatly improved and the dynamic range that can express the tone of an image is widened, which makes it possible for an output device to output an image in a dynamic range that can cover most of the human visual characteristics. Along with such the improvement in the dynamic range of an output device, the conversion characteristic of the output device for displaying an image with an extended dynamic range is standardized as SMPTE Standard ST 2084:2014, as reported in Report ITU-R BT.2246-1 (08/2012)/The present state of ultra high definition television.

As shown in the above report, it has been scientifically verified that human visual characteristics are such that recognizable JND (Just Noticeable Difference) differs depending upon perceived luminance. Based on this fact, SMPTE Standard ST 2084:2014 associates the code value of the image signal with the luminance value displayed by the output device, standardizes them. For this reason, it is expected that the image signal input to the output device is photoelectrically converted based on the inverse function of this conversion characteristic.

On the other hand, a case may be assumed in which an image may be later displayed both on a display device having a wide dynamic range and on a display device having a conventional dynamic range. In such a case, rather than performing tone conversion conforming to the respective standards on an image at the time of shooting, the recorded image becomes more versatile and its value as content also improves by performing coding that can correspond to both of the wide dynamic range and the conventional dynamic range on the image at the time of shooting, and then performing tone conversion that conforms to the respective standards on the image at the time of post-editing after recording. At that time, it is necessary to assume that the image is converted into the image with a wide dynamic range at the time of post-editing, and an image coding method that efficiently saves subject information of the real world as an image signal is required.

Also, Japanese Patent Application Laid-Open No. 2008-234315 discloses an image encoding method that efficiently performs tone compression on the basis of the response characteristics of human retina.

As shown in Report ITU-R BT.2246-1 (08/2012)/the present state of ultra high definition television, human visual characteristics are such that recognizable JND (Just Noticeable Difference) differs depending upon perceived luminance. However, in the tone compression shown in Japanese Patent Application Laid-Open No. 2008-234315, the fact that human visual characteristics differ depending upon perceived luminance is not taken into consideration. Therefore, encoding with high efficiency cannot be achieved when the display luminance of an output device is taken into consideration.

SUMMARY OF THE INVENTION

The present invention has been made in consideration of the above situation, and efficiently encodes image signals in consideration of human visual characteristics.

According to the present invention, provided is an image processing apparatus comprising: an acquisition unit that acquires exposure information of an image signal output from an image sensor; a setting unit that sets tone conversion characteristic based on the exposure information and a visual characteristic; and a tone conversion unit that performs tone conversion on the image signal using the tone conversion characteristic, wherein the visual characteristic is a minimum amount of luminance change that a human can recognize and that differs for different luminances, and the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection.

Further, according to the present invention, provided is an image capturing apparatus comprising: an image sensor; and an image processing apparatus comprising: an acquisition unit that acquires exposure information of an image signal output from the image sensor; a setting unit that sets tone conversion characteristic based on the exposure information and visual characteristics; and a tone conversion unit that performs tone conversion on the image signal using the tone conversion characteristic, wherein the visual characteristics is a minimum amount of luminance change that a human can recognize and that differ for different luminance, and the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection.

Furthermore, according to the present invention, provided is an image processing method comprising: acquiring exposure information of an image signal output from an image sensor; setting tone conversion characteristic based on the exposure information and visual characteristics; and performing tone conversion on the image signal using the tone conversion characteristic, wherein the visual characteristics is a minimum amount of luminance change that a human can recognize and that differ for different luminance, and upon setting the tone conversion characteristic, an intersection of a first function that indicates a ratio of an amount of luminance change per one code value difference of the image signal before the tone conversion is performed and a second function that indicates a ratio of a minimum amount of luminance change that a human can recognize, is obtained for each luminance, and the tone conversion characteristic are set based on the obtained intersection.

Further, according to the present invention, provided is a non-transitory readable storage medium having stored thereon a program which is executable by a computer to cause the computer to function as an image processing apparatus that comprises: an acquisition unit that acquires exposure information of an image signal output from an image sensor; a setting unit that sets tone conversion characteristic based on the exposure information and visual characteristics; and a tone conversion unit that performs tone conversion on the image signal using the tone conversion characteristic, wherein the visual characteristics is a minimum amount of luminance change that a human can recognize and that differ for different luminance, and the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. In the embodiment of the present invention, a case where the image processing method of the present invention is adopted in an image processing unit in a digital video camera will be described as an example, however, the present invention is not limited to image processing performed inside of the image capturing apparatus, and can be used as a general-purpose image processing method.

Figure 1:
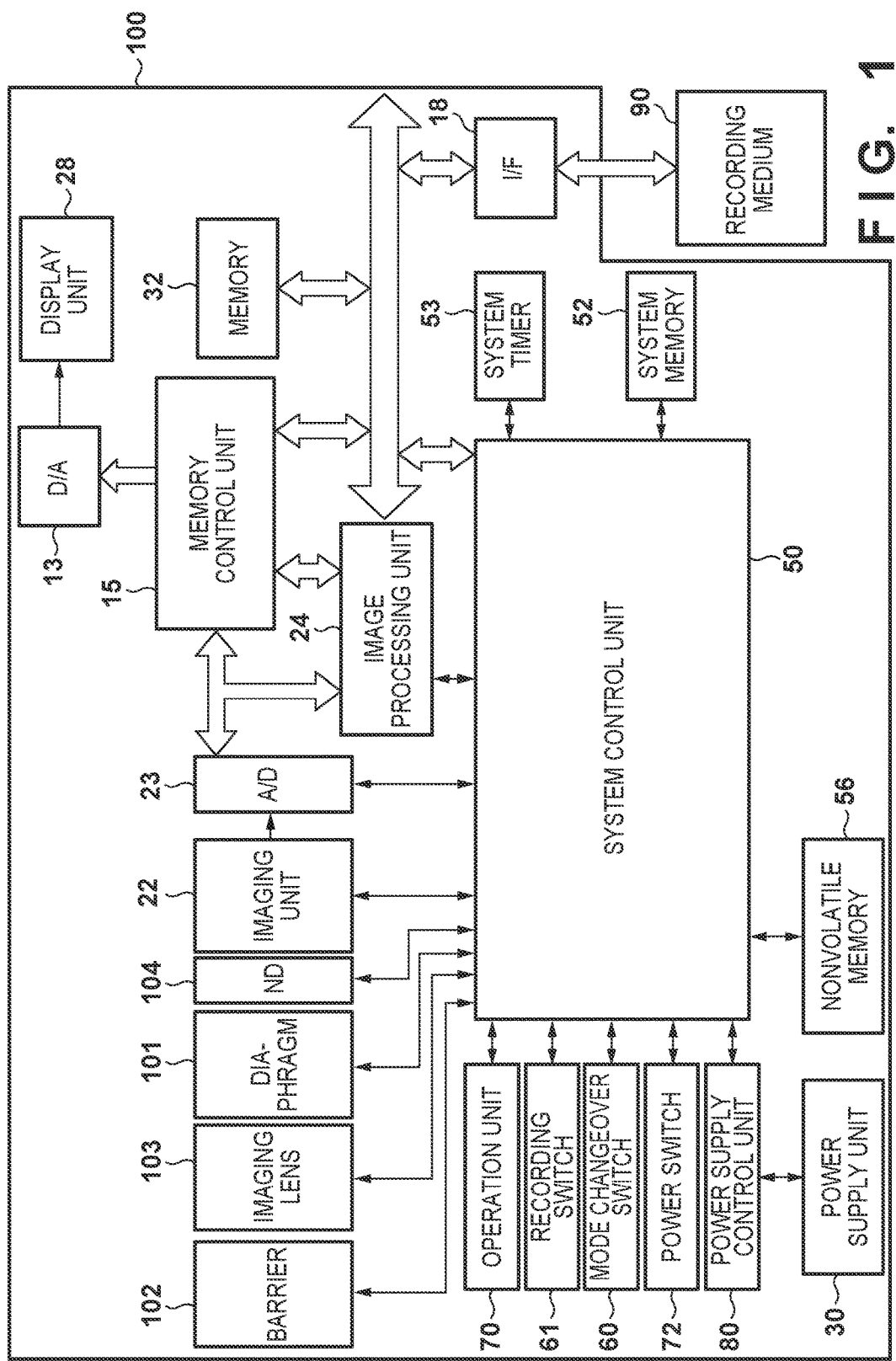
FIG. 1 is a block diagram illustrating a configuration of a digital video camera according to an embodiment of the present invention.

FIG. 1 is a block diagram illustrating an internal configuration of a digital video camera 100 according to an embodiment of the present invention. In FIG. 1, an imaging lens 103 is a lens group including a zoom lens and a focus lens, and forms a subject image. A diaphragm 101 is an aperture used for adjusting a light amount. An ND filter (neutral density filter) 104 is a filter used for dimming. An imaging unit 22 is an image sensor comprised of a CCD, a CMOS device or the like for converting an optical image into an electric signal. The imaging unit 22 also has functions of controlling charge accumulation by an electronic shutter, changing analog gain, reading speed, and the like. A barrier 102 covers an imaging system including the imaging lens 103 of the digital video camera 100, thereby preventing contamination and breakage of the imaging system including the imaging lens 103, the diaphragm 101, and the imaging unit 22.

An A/D converter 23 converts an analog signal output from the imaging unit 22 into a digital signal (image data). An image processing unit 24 performs processing such as color conversion processing, gamma correction, addition of digital gain, and the like on the image data from the A/D converter 23 or image data from a memory control unit 15. In addition, the image processing unit 24 performs predetermined arithmetic processing using the captured image data, and transmits the calculation result to a system control unit 50. The system control unit 50 performs exposure control, focus adjustment control, white balance control, etc. based on the transmitted calculation result. As a result, AF (auto focus) processing, AE (automatic exposure) processing, AWB (auto white balance) processing, and the like of the TTL (through-the-lens) method are performed. Details of the image processing unit 24 will be described later.

The image data output from the A/D converter 23 is written to a memory 32 via the image processing unit 24 and the memory control unit 15, or directly via the memory control unit 15. The memory 32 stores image data captured by the imaging unit 22 and converted into digital data by the A/D converter 23, and image data to be displayed on a display unit 28. The memory 32 has sufficient storage capacity to store moving images and sounds for a predetermined period.

The memory 32 also serves as a memory (video memory) for image display. A D/A converter 13 reads the image data for display stored in the memory 32 via the memory control unit 15, converts it into an analog signal, and supplies it to the display unit 28. In this manner, the image data for display written in the memory 32 is displayed on the display unit 28 via the D/A converter 13. The display unit 28 performs display on a display such as an LCD in accordance with an analog signal from the D/A converter 13. The digital signal once A/D converted by the A/D converter 23 and stored in the memory 32 is converted into an analog signal by the D/A converter 13 and sequentially transferred to the display unit 28 for display, thereby functioning as an electronic viewfinder, and it is possible to display a through image.

A nonvolatile memory 56 is an electrically erasable/recordable memory, and an EEPROM is used for example. In the nonvolatile memory 56, constants, programs and the like for operation of the system control unit 50 are stored. Here, the program is a program for executing a flowchart described later.

The system control unit 50 controls the entire digital video camera 100. By executing the program recorded in the nonvolatile memory 56, each processing of the first embodiment to be described later is realized. A RAM is used as a system memory 52, and constants and variables for operation of the system control unit 50, programs read from the nonvolatile memory 56, and the like are expanded. The system control unit 50 also controls display by controlling the memory 32, the D/A converter 13, the display unit 28, and the like.

A system timer 53 is a time measuring unit that measures the time used for various controls and the time of the built-in clock. A mode changeover switch 60, a recording switch 61, and an operation unit 70 are used for inputting various operation instructions to the system control unit 50.

The mode changeover switch 60 switches the operation mode of the system control unit 50 to one of a plurality of modes including a moving image recording mode, a still image recording mode, a reproduction mode, and the like. As modes included in the moving image recording mode and the still image recording mode, there are an auto shooting mode, an auto scene discrimination mode, a manual mode, various scene modes that require shooting settings for each shooting scene, a program AE mode, a custom mode, and the like. In the moving image recording mode, the mode changeover switch 60 is used to directly switch to one of these modes. Alternatively, after switching to the moving image recording mode once using the mode changeover switch 60, any one of these modes included in the moving image recording mode may be selected by using another operation member. The recording switch 61 switches between a shooting standby state and a shooting state. The system control unit 50 starts a series of operations from signal reading from the imaging unit 22 to writing moving image data on a recording medium 90 in response to an operation of the recording switch 61.

Each operation member of the operation unit 70 is appropriately assigned a function for each scene by selectively operating various function icons displayed on the display unit 28, and functions as various function buttons. Examples of the function buttons include an end button, a return button, an image advance button, a jump button, a narrowing down button, an attribute change button, and the like. For example, when a menu button is pressed, a menu screen showing various choices that can be set are displayed on the display unit 28. A user can intuitively make various settings using the menu screen displayed on the display unit 28 and a cross key in the up, down, right, and left directions and a SET button.

A power supply control unit 80 includes a battery detection circuit, a DC-DC converter, a switch circuit for switching blocks to be energized, and the like, and detects the presence or absence of a battery, the type of battery, and the remaining battery level. Further, the power supply control unit 80 controls the DC-DC converter based on the detection result and the instruction of the system control unit 50, and supplies necessary voltage to each unit including the recording medium 90 for a necessary period. A power supply unit 30 includes primary batteries such as alkaline batteries and lithium batteries, secondary batteries such as NiCd batteries, NiMH batteries, and Li ion batteries, AC adapters, and the like.

An I/F 18 is an interface with a recording medium 90 such as a memory card or a hard disk, or an external output device. Shown in FIG. 1 is the state at the time of connection with the recording medium 90. The recording medium 90 is a recording medium such as a memory card for recording captured images and is comprised of a semiconductor memory, a magnetic disk, or the like.

Figure 2:
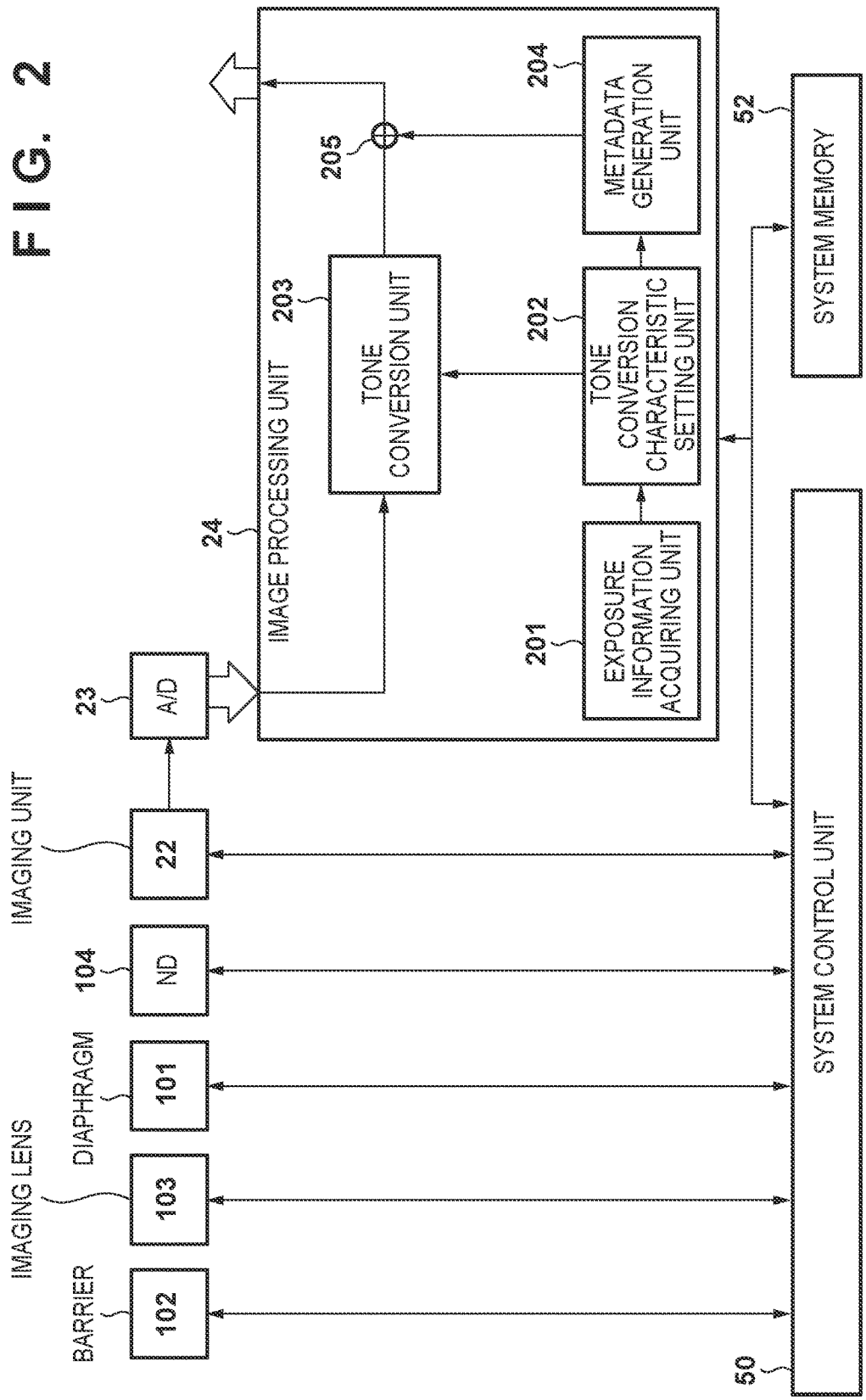
FIG. 2 is a block diagram illustrating an internal configuration of an image processing unit according to the embodiment.

Next, the internal configuration of the image processing unit 24 according to the embodiment will be described. FIG. 2 is a block diagram showing an internal configuration and a related part of the image processing unit 24. Normally, WB control, sharpness control, and the like are also performed in this portion, but these processes are not necessary for the description of the embodiment and is therefore omitted. It is to be noted that each block of the image processing unit 24 can acquire any data inside the digital video camera 100 through the system control unit 50.

In FIG. 2, an exposure information acquiring unit 201 acquires exposure information (information such as aperture, exposure time, sensitivity, density of ND filter, and so on) and transmits it to a tone conversion characteristic setting unit 202. There are various methods for obtaining the exposure information, including a method of acquiring the exposure information as metadata attached to image data, a case of acquiring as exposure information of the camera 100 from the system control unit 50, a case of manual input by the user, for example. In addition, the information acquired by the exposure information acquiring unit 201 is not limited to the exposure information of an input image. For example, in the case of shooting while assuming image processing in post-shooting processing through on-set display, the total sensitivity including the assumed image processing is calculated and input the tone conversion characteristic setting unit 202 as exposure information. The tone conversion characteristic setting unit 202 determines tone conversion characteristic based on the exposure information acquired by the exposure information acquiring unit 201 and set them in the tone conversion unit 203. The method of determining tone conversion characteristic at this time will be described in detail.

In addition, a metadata generation unit 204 acquires information on the tone conversion characteristic calculated by the tone conversion characteristic setting unit 202, converts the information into a data format that can be attached to the image, and transmits the information to an information superimposing unit 205. The image data input from the A/D converter 23 undergoes tone conversion by the tone conversion unit 203, and thereafter metadata is added to the image data by the information superimposing unit 205, and then the image data is outputted from the image processing unit 24.

Figure 3:
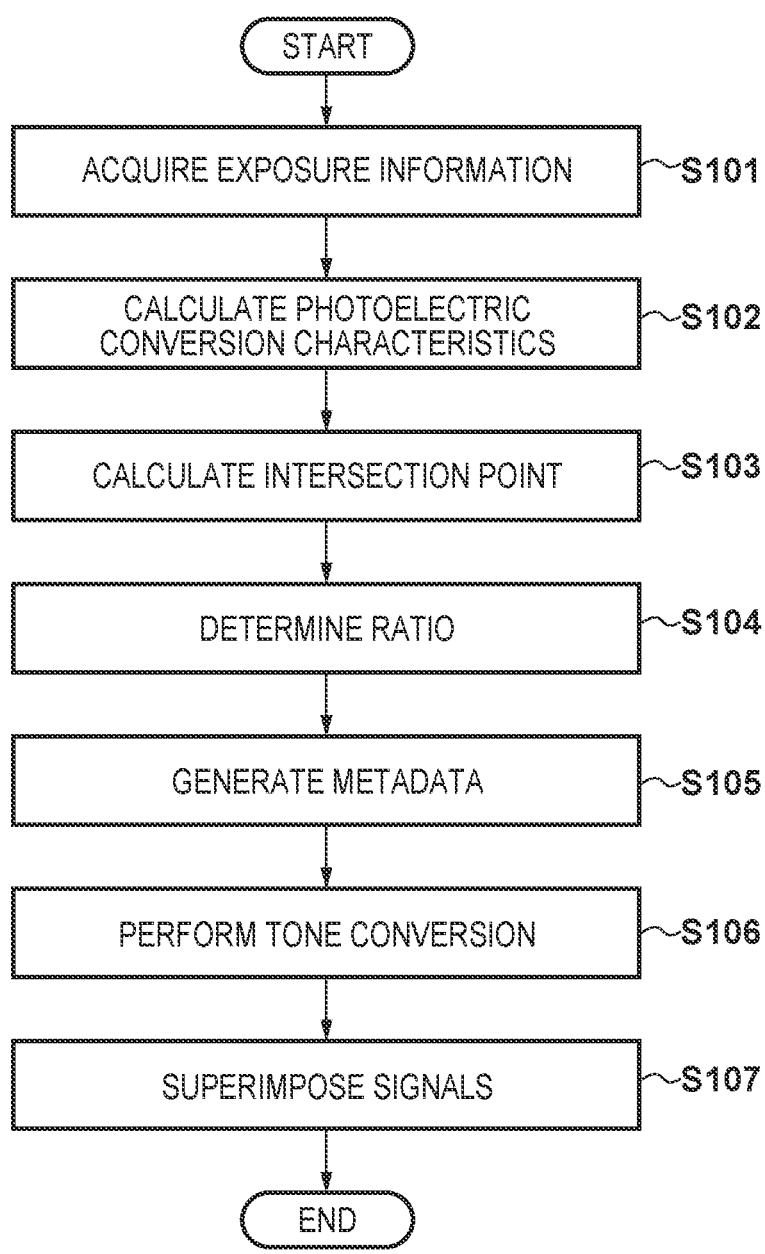
FIG. 3 is a flowchart of image processing according to the embodiment.

Subsequently, a method of determining tone conversion characteristic in the tone conversion characteristic setting unit 202 and a method of generating metadata in the metadata generation unit 204 will be described in detail using a flowchart of FIG. 3.

First, in step S101, exposure information such as aperture, exposure time, sensitivity, density of ND filter, and so on, is acquired. In step S102, photoelectric conversion characteristics are calculated. In the present embodiment, in order to show an example in which the present invention is applied to a part of the image processing section of the video camera 100, it is described on the premise that an image signal is obtained by performing photoelectric conversion with respect to the input light quantity using a linear function. However, it is not necessary to limit the photoelectric conversion characteristics to a linear function, and the present invention can be applied as long as the conversion characteristics between image signals of the input image and the light quantities are known. The photoelectric conversion characteristics described here are characteristics in which the absolute luminance of an object field of an input image is associated with a code value of an input image signal. For example, the maximum By value is calculated from the exposure information acquired in step S101 and is associated with the maximum code value of the image signal.

Assuming that the input image signal is photoelectrically converted based on linear conversion characteristics, all the code values of the image signal are related to the absolute luminance by the number of bits of the input image signal.

Here, a method of associating the code value of the image signal with the absolute luminance value of the object field will be described using specific numerical values. The Bv value (reference Bv value) of the reference luminance value in the APEX (Additive System of Photographic Exposure) expression is obtained as follows. Here, the reference luminance value is a luminance value with reference to a subject (subject having a reflectance of 18%) which is 18% input gray in image data. The reference Bv value, which is obtained by converting each exposure parameter into APEX unit and expressing the reference luminance value by absolute luminance, is $$\text{Reference } Bv \text{ value} = 2^{(Av+Tv-Sv)} \times (0.32 \times k) [\text{cd/m}^2] \qquad (1)$$

Note that Av is an aperture value, Tv is a shutter speed, and Sv is an exposure (exposure control value) obtained by converting the imaging sensitivity into APEX units. Also, k is a calibration coefficient and is used to convert the luminance value expressed in units of APEX to cd/m² (or nit) which is a unit of absolute luminance so that the 18% input gray becomes the reference Bv value. In the present embodiment, k=12.5 is set. In order to convert the luminance value Z expressed in APEX units to the absolute luminance value X, $X = 2^Z \times (0.32 \times k)$ is calculated based on the relational expression $\log_2(X/0.32 \times k)$. For example, if Av=F4.0, Tv=1/128, Sv=ISO 200, from the equation (1), $$\text{Reference } Bv \text{ value} = (2^{(4(Av)+7(Tv)-6(Sv))}) \times (0.32 \times 12.5)$$
$$= 128 \ [\text{cd/m}^2].$$

Here, if the dynamic range of the image capturing apparatus is 1200%, the ratio of the reference luminance value to the upper limit value of the luminance value is 20%, and the number of bits of the image data is 14, Code value of reference luminance value=
$(2^{\text{number of bits}}) \times (\text{reference luminance value } [\%]/\text{dynamic range } [\%])$ (2)

Thus, the code value of the reference signal is obtained. When numerical values are used in the above formula (2), $$\text{Code value of reference signal} = (2^{14}) \times (20/1200) = 273$$

That is, the code value of the reference signal is obtained as 273.

Since the code value of the reference signal is 273 and the reference Bv value is 128 cd/m², assuming that the photoelectric conversion is linearly performed, the Bv value of the maximum code value 16383 is 7681 cd/m². As a result, it is understood that the photoelectric conversion characteristics of the input image linearly express subject luminance from 0 to 7681 cd/m². Since the photoelectric conversion characteristics are calculated based on the exposure information, it is necessary to recalculate the photoelectric conversion characteristics for images having different exposure information.

Figure 4:
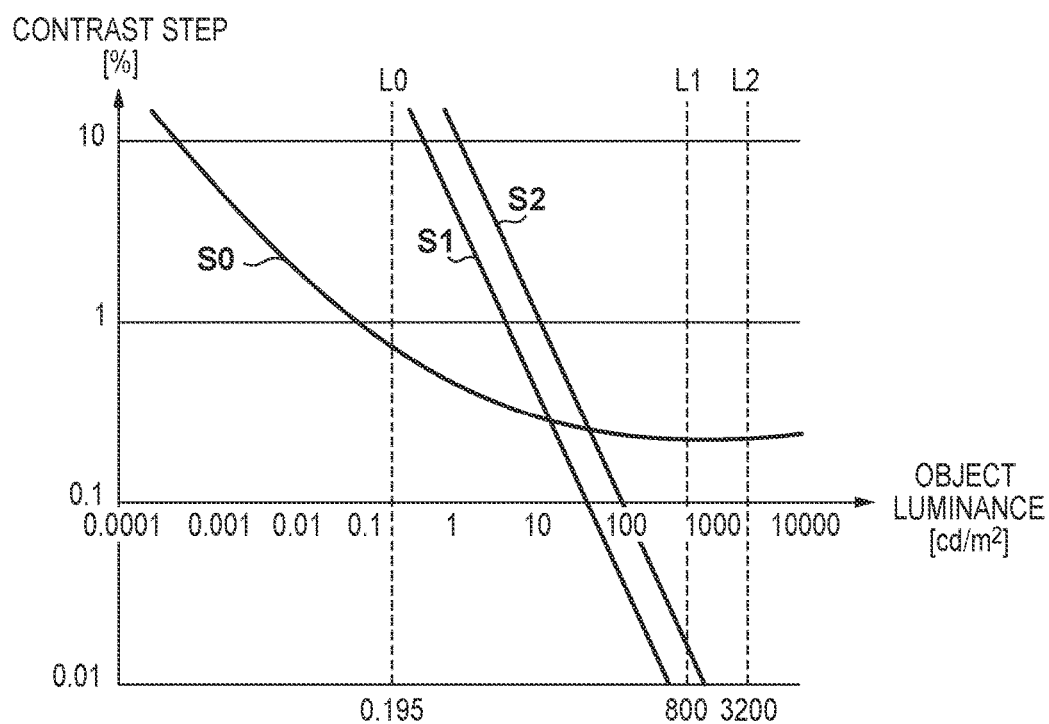
FIG. 4 is a diagram of a graph showing relationship between a model function according to visual characteristics and tone conversion characteristic according to the embodiment.

Next, in step S103, an intersection point of a model function based on visual characteristics and photoelectric conversion characteristics is calculated. FIG. 4 is a graph showing a model function S0 based on human visual characteristics and a signal output characteristic S1, with the abscissa representing the object luminance and the ordinate representing the contrast step. It is to be noted that the contrast step Cs is expressed by the following equation (3), where ΔL represents the minimum amount of luminance change that can be expressed at a certain luminance L and Cs represents the contrast step at that time.

$$Cs = \Delta L/L \qquad (3)$$

Here, the smallest luminance change amount ΔL that can be expressed is the change amount of the luminance assigned to adjacent code values, so if the luminance corresponding to the i-th code is L(i), $$Cs = (L(i+1) - L(i))/L(i) \qquad (4)$$

holds. According to human visual characteristics, since recognizable contrast step changes depending on luminance, the model function S0 nonlinearly changes with respect to the object luminance expressed on the horizontal axis. On the upper side of the model function S0, since the contrast step with respect to the change amount ΔL of the luminance is large, it is possible to recognize the change amount of the luminance per one code value difference. On the other hand, on the lower side of the model function S0, since the contrast step with respect to the change amount ΔL of the luminance is small, it is impossible to recognize the change amount of the luminance per one code value difference. That is, in the area below the model function S0, the gradation is wasted.

Figure 5:
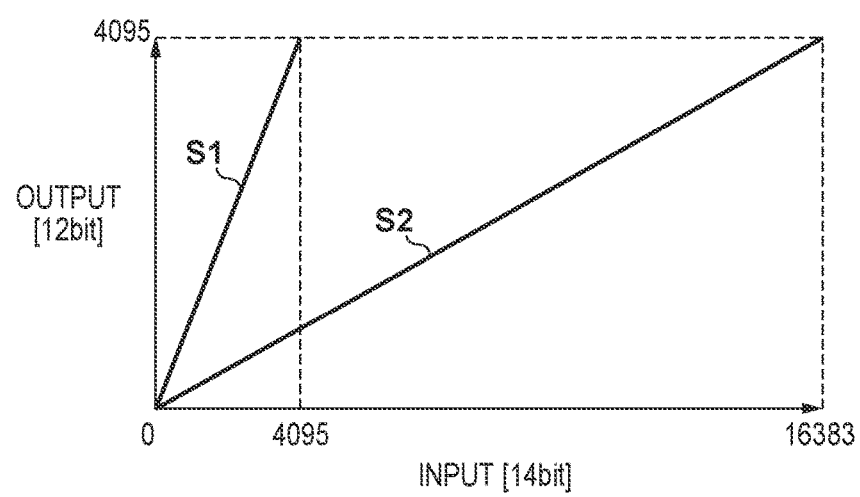
FIG. 5 is a diagram of a graph showing the tone conversion characteristic according to the embodiment.

On the other hand, considering the number of bits of the input signal and the output signal to the image processing unit 24, ideally it is preferable to record a RAW image signal as it is when recording in the video camera. However, from the viewpoint of the enlarged size of the recording signal, restriction of the rate of information transfer to the recording apparatus, or simplification of the circuit configuration of the image processing circuit, it is generally preferable to record the image signal as an image signal expressed by the number of bits smaller than that of the RAW image signal. For example, as shown in FIG. 5, when tone is linearly reduced with the number of bits of the input image being 1 and the number of bits of the recorded image being 12, the tone conversion characteristic S2 shown in FIG. 5 is adapted. Note that if the contrast step corresponding to the subject luminance shown by the line S1 in FIG. 5 is the signal output characteristic S1 in FIG. 4, the line S2 in FIG. 5 corresponds to the signal output characteristic S2 in FIG. 4.

Here, considering the positional relationship between the signal output characteristic S2 in FIG. 4 and the model function S0, the signal output characteristic S2 is located above the model function S0 on the low luminance side below about 80 cd/m². This means that up to about 80 cd/m² on the low luminance side of the image converted using the signal output characteristic S2 is represented by a contrast step larger than human visual characteristics. That is, the contrast difference in a flat subject is visually perceived in a region where the luminance gently changes with a gradual change, resulting in undesirable image quality called banding or tone jump.

In order to prevent this, it is necessary to perform tone conversion with tone conversion characteristic, which is as close as possible to the model function S0 and the part below the model function S0 is large. Focusing on the tone conversion characteristic S1 in FIG. 5, this is equal to the tone conversion characteristic S1 in FIG. 4. In this case, the part exceeding the model function S0 is greatly reduced as compared with the tone conversion characteristic S2, and the region exceeding the model function S0 is up to about 20 cd/m$^2$ on the low luminance side. However, as can be seen from FIG. 5, codes can be allocated to only a part of the input light quantity, and the subject luminance range that can be expressed by the tone drastically decreases.

Therefore, the tone conversion characteristic S1 is adapted up to an intersection C0 of the tone conversion characteristic S1 and the model function S0, and for the high luminance part larger than the intersection C0, tone conversion characteristic capable of performing tone conversion up to the maximum code value of the input image signal are adapted. Accordingly, in the present embodiment, an intersection between the signal conversion characteristics and the model function based on the visual characteristics is obtained. There is no restriction on the calculation method of the intersection, and the coordinates of the intersection may be obtained directly or analytically. The intersection to be calculated may be coordinate values on a coordinate plane as shown in FIG. 4, or may be calculated as a code value of an input image signal or may be calculated as an absolute luminance value of an input image signal.

Figure 6:
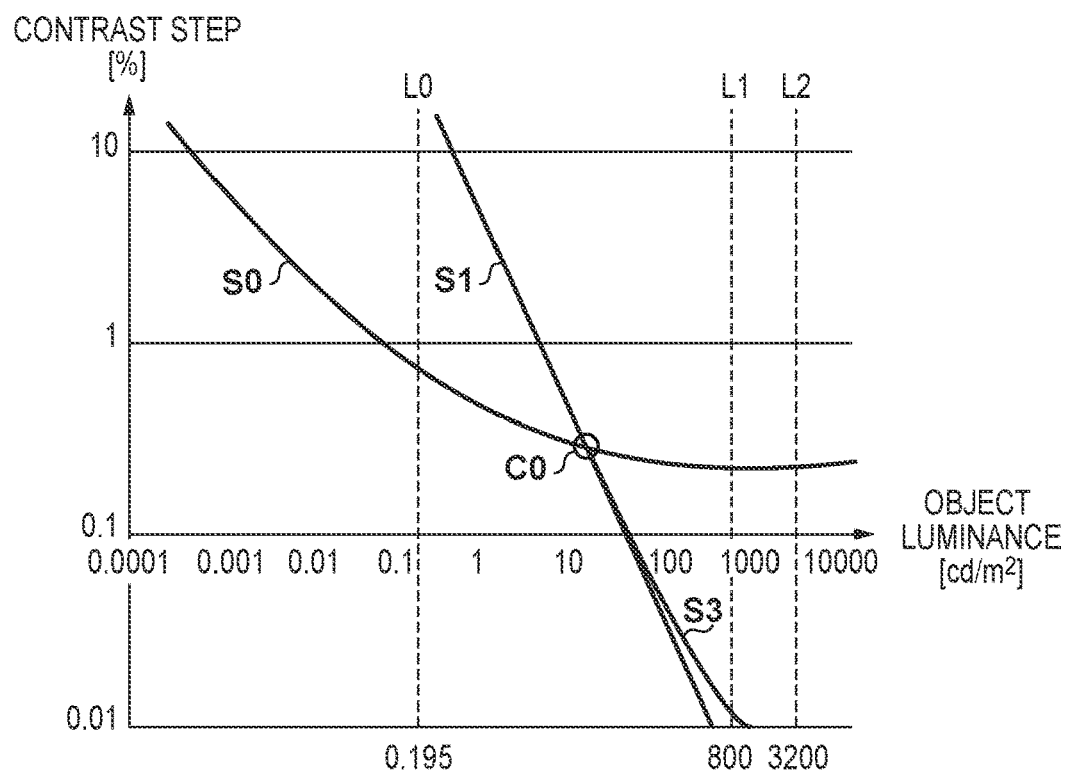
FIG. 6 is a diagram of a graph showing relationship between a model function according to visual characteristics and tone conversion characteristic according to the embodiment.
Figure 7:
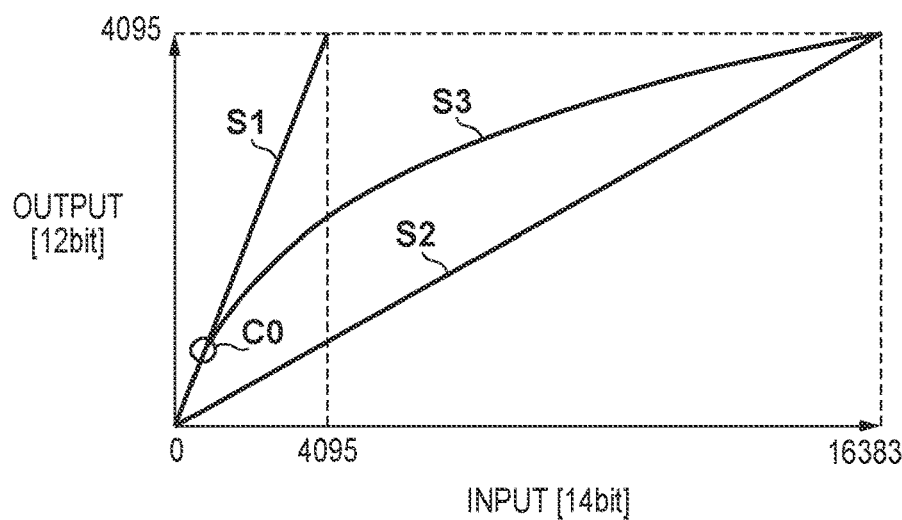
FIG. 7 is a diagram of a graph showing the tone conversion characteristic according to the embodiment.

Next, in step S104, the ratio of the linear characteristic portion of the tone conversion characteristic is determined. Here, the luminance corresponding to the intersection C0 calculated in step S103 is converted into the code value of the input image signal, and for the code values on the low luminance side which are not greater than the code value of the intersection, the photoelectric conversion characteristic itself (that is, the straight line with the slope 1) is adapted. On the other hand, for code values on the high luminance side which are greater than the code value of the intersection, another tone conversion characteristic is adapted. By this, the tone conversion characteristic capable of expressing gradation after performing tone conversion on the all code values of the input image signal is obtained. There is no restriction on the tone conversion characteristic on the higher luminance side from the code value of the intersection, and a logarithmic conversion characteristic whose functional characteristic is blow the model function based on the visual characteristics, being capable of expressing smooth gradation and well compatible with retina response characteristics may be adapted. In FIG. 6, S3 is shown as an example of tone conversion characteristic having a linear characteristic up to the intersection and represented by a logarithmic function above the intersection. The tone conversion characteristic calculated in this manner can be expressed as S3 in FIG. 7 as the relationship between the code values of the input image and the code values of the output image.

In FIG. 6, the ratio of the linear characteristic portion is determined as it is based on the code value of the intersection. However, assuming the case of performing the sensitivity change and the gradation adjustment at the time of the post-editing after recording, the code value of the intersection may not be used as it is as a junction between the linear characteristic portion and the nonlinear characteristic portion in tone conversion characteristic. For example, when there is a main subject in the luminance region near the intersection and gradation adjustment is assumed at the time of post-editing, in order to prevent degradation of image quality due to banding near the main subject by gradation adjustment, a junction may be moved to the high luminance side by giving more weight to the gradation in the vicinity of the main subject.

In step S105, the information of the intersection calculated in step S103 and the ratio of the linear characteristic portion in the tone conversion characteristic determined in step S104 are converted into a format recordable as metadata. As an example of the metadata about the intersection to be appended, there are the absolute luminance of the intersection itself, the code value of the image signal after tone conversion corresponding to the absolute luminance of the intersection, the code value of the input image signal corresponding to the absolute luminance of the intersection, and the like. There are various ways of expressing the ratio. For example, the ratio of the linear function to the input dynamic range, the ratio of the linear function to the code values of the output image signal, the absolute luminance of the junction, the code value of the junction in the input image signal, the code value of the junction in the output image, and so forth. Furthermore, as information on the junction, relative information from the intersection point can be expressed by a relative code value, relative F number, or the like. Further, the intersection information and the junction information may be other values capable of generating one of these data. For example, an index value of a table prepared in association with these values may be used. With these two metadata, it is possible to know which luminance region in the image does or does not satisfy the visual characteristics at the time of post-processing, and how the range satisfying the visual characteristics changes when sensitivity is changed or gradation is adjusted.

In step S106, tone conversion is applied to the input image signal based on the tone conversion characteristic generated in step S104, and in step S107, the metadata generated in step S105 is attached to the tone converted image data.

In the present embodiment, processing is explained in the order of performing tone conversion on image data, then assigning metadata. However, there is no restriction on the order of processing, and after the metadata is added, tone conversion may be performed on image data.

By outputting the tone converted image in this manner, in image shooting that assumes to output image data in association with absolute luminance, it is possible to keep the most efficient tone information based on human visual characteristics by considering the photoelectric conversion characteristics of the input image.

The present invention has been described in detail based on preferred embodiments thereof, the present invention is not limited to these specific embodiments, and various embodiments within the scope not deviating from the gist of the present invention are also included in the present invention. Further, part of the above embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-224536, filed Nov. 17, 2016, which is hereby incorporated by reference herein in its entirety.

What is claimed is:

1. An image processing apparatus comprising one or more processors and/or circuitry which functions as:
    an acquisition unit that acquires exposure information of an image signal output from an image sensor;
    a setting unit that sets tone conversion characteristic based on the exposure information and a visual characteristic; and
    a tone conversion unit that performs tone conversion on the image signal using the tone conversion characteristic,
    wherein the visual characteristic is a minimum amount of luminance change that a human can recognize and that differs for different luminances, and
    the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection.

2. The image processing apparatus according to claim 1, wherein the tone conversion characteristic has a linear characteristic portion and a non-linear characteristic portion with the luminance set based on the intersection as a junction point.

3. The image processing apparatus according to claim 2, wherein the setting unit sets the tone conversion characteristic corresponding to luminance up to the intersection to have a linear characteristic and the tone conversion characteristic corresponding to luminance higher than the intersection to have a nonlinear characteristic.

4. The image processing apparatus according to claim 3, wherein the linear characteristic has a characteristic that an input code value and an output code value have the same code value.

5. The image processing apparatus according to claim 3, wherein the luminance of the intersection is obtained by obtaining coordinates of the intersection of the first function and the second function.

6. The image processing apparatus according to claim 3, wherein luminance of the intersection is obtained analytically.

7. The image processing apparatus according to claim 1, further comprising an appending unit for appending information on the tone conversion characteristic to the tone converted image signal.

8. The image processing apparatus according to claim 7, wherein the tone conversion characteristic has a linear characteristic portion and a non-linear characteristic portion with the luminance set based on the intersection as a junction point, and
    the appended information of the tone conversion characteristic includes information on the intersection and information on a ratio of the linear characteristic portion in the tone conversion characteristic.

9. The image processing apparatus according to claim 8, wherein the information on the intersection is a luminance value of the intersection or a code value indicating a luminance value of the intersection.

10. The image processing apparatus according to claim 8, wherein the information on the ratio includes at least one of a ratio of the linear characteristic portion in the tone conversion characteristic, a ratio of the linear characteristic portion in a dynamic range of the image signal output from the image sensor, a ratio of the linear characteristic portion in a code value of the image signal to be output, absolute luminance of a junction point between the linear characteristic portion and the non-linear characteristic portion, a code value of the junction point in the image signal output from the image sensor, and a code value of the junction point in the image signal to be output.

11. The image processing apparatus according to claim 8, wherein a ratio of the linear characteristic portion in the tone conversion characteristic changes in accordance with a tone of the image signal output from the image sensor and a tone of an image to be output.

12. The image processing apparatus according to claim 1, wherein the image processing apparatus has a first mode that assumes to perform display by relating a code value of the image signal output from the image sensor and an absolute luminance value to be displayed by an image display device and a second mode that assumes to perform display without relating the code value of the image signal output from the image sensor and the absolute luminance value to be displayed by an image display device, and the setting unit sets the tone conversion characteristic in the first mode.

13. The image processing apparatus according to claim 1, wherein the exposure information includes at least one of a diaphragm, a sensitivity, an exposure time, and a concentration of a neutral density filter.

14. An image capturing apparatus comprising:
    an image sensor; and
    an image processing apparatus comprising:
        an acquisition unit that acquires exposure information of an image signal output from the image sensor;
        a setting unit that sets tone conversion characteristic based on the exposure information and visual characteristics; and
        a tone conversion unit that performs tone conversion on the image signal using the tone conversion characteristic,
    wherein:
        the visual characteristics is a minimum amount of luminance change that a human can recognize and that differ for different luminance,
        the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection, and each unit of the image processing apparatus is implemented by at least one processor or circuitry, or combination thereof.

15. An image processing method comprising:

acquiring exposure information of an image signal output from an image sensor;

setting tone conversion characteristic based on the exposure information and visual characteristics; and performing tone conversion on the image signal using the tone conversion characteristic, wherein the visual characteristics is a minimum amount of luminance change that a human can recognize and that differ for different luminance, and upon setting the tone conversion characteristic, an intersection of a first function that indicates a ratio of an amount of luminance change per one code value difference of the image signal before the tone conversion is performed and a second function that indicates a ratio of a minimum amount of luminance change that a human can recognize, is obtained for each luminance, and the tone conversion characteristic are set based on the obtained intersection.

16. A non-transitory readable storage medium having stored thereon a program which is executable by a computer to cause the computer to function as an image processing apparatus that comprises:

an acquisition unit that acquires exposure information of an image signal output from an image sensor;

a setting unit that sets tone conversion characteristic based on the exposure information and visual characteristics; and a tone conversion unit that performs tone conversion on the image signal using the tone conversion characteristic, wherein the visual characteristics is a minimum amount of luminance change that a human can recognize and that differ for different luminance, and the setting unit obtains for each luminance an intersection of a first function that indicates a ratio of an amount of luminance change per one code value difference of the image signal before the tone conversion is performed and a second function that indicates a ratio of a minimum amount of luminance change that a human can recognize, and sets the tone conversion characteristic based on the obtained intersection.

* * * * *